(No Model.) 2 Sheets—Sheet 2.
L. P. PITTS.
COTTON PLANTER AND CHOPPER.
No. 352,149. Patented Nov. 9, 1886.
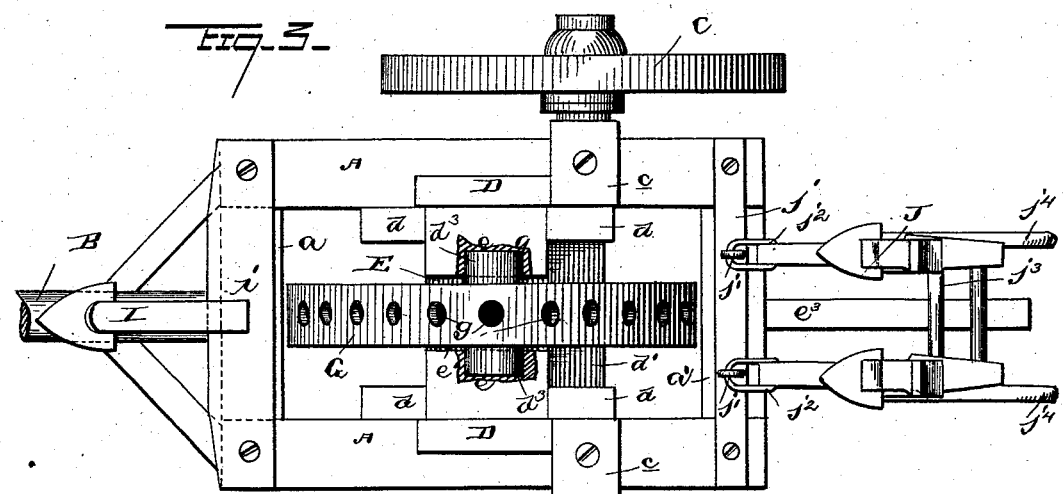
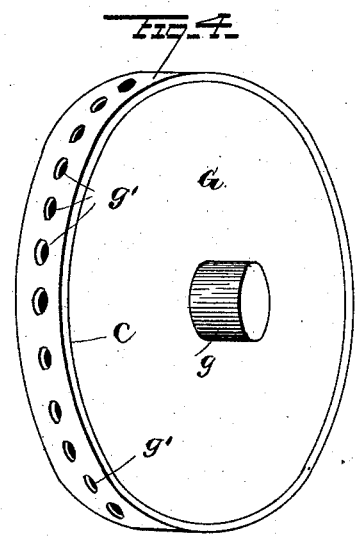
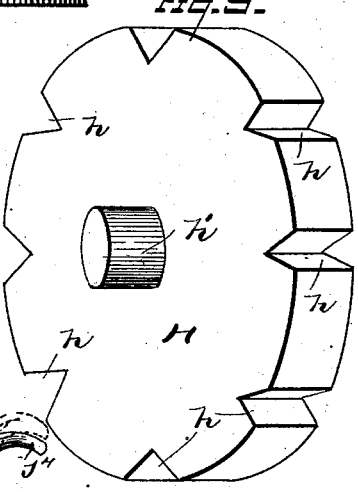
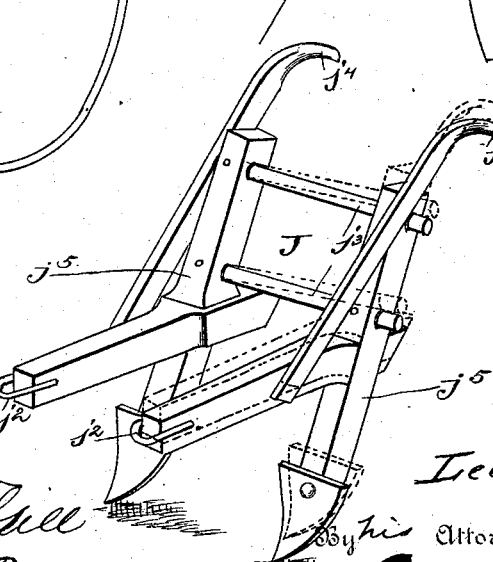
Witnesses Inventor
Lee P. Pitts,
By his Attorneys

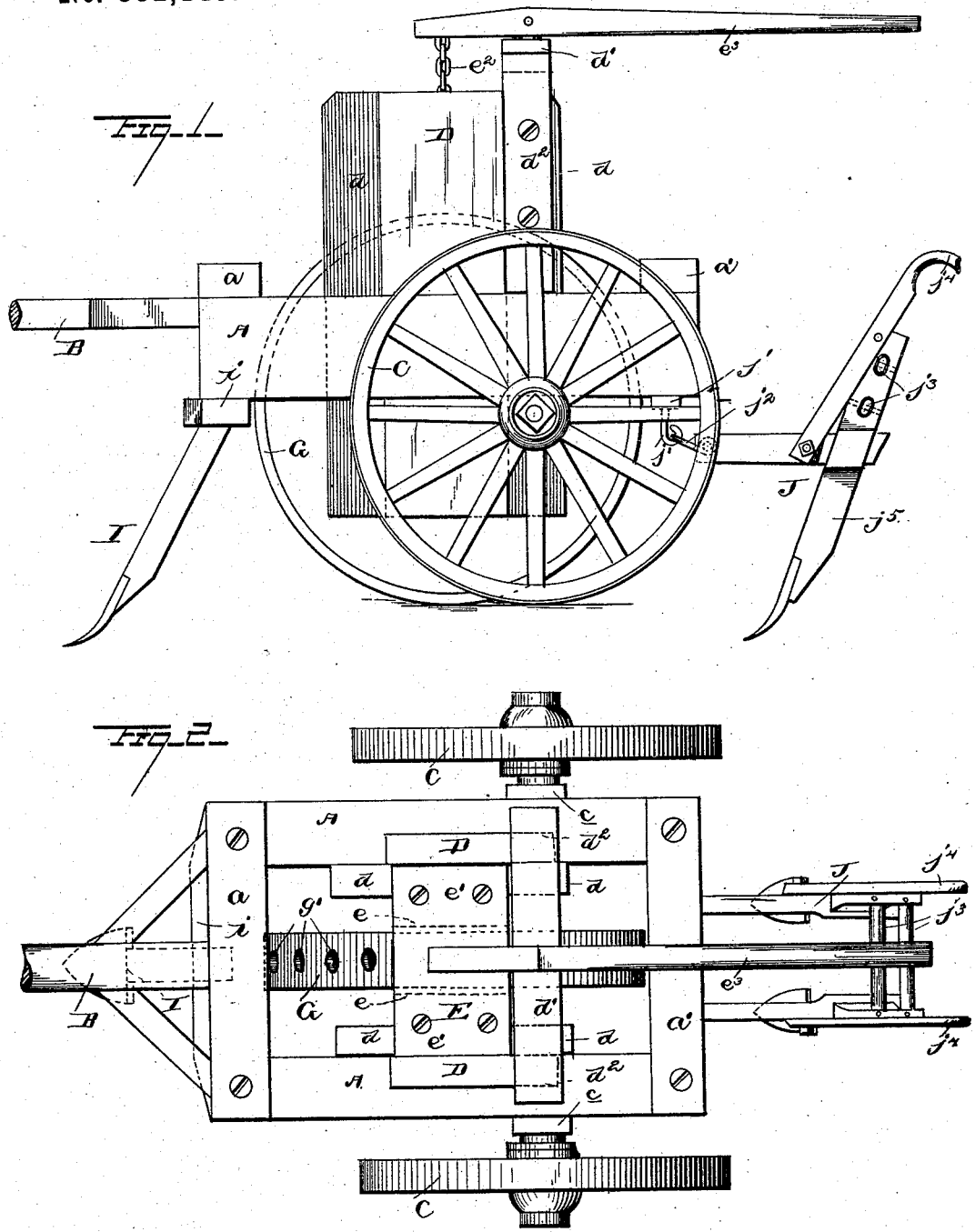

UNITED STATES PATENT OFFICE.

LEE PASCHAL PITTS, OF DEPORT, TEXAS.

COTTON PLANTER AND CHOPPER.

SPECIFICATION forming part of Letters Patent No. 352,149, dated November 9, 1886.

Application filed July 22, 1886. Serial No. 208,769. (No model.)

*To all whom it may concern:*

Be it known that I, LEE PASCHAL PITTS, a citizen of the United States, residing at Deport, in the county of Lamar and State of Texas, have invented a new and useful Improvement in Cotton Planters and Choppers, of which the following is a specification.

My invention relates to machines for planting, chopping, and cultivating cotton, and the object of my invention is to produce a simple and durable machine which shall be capable of planting, chopping, and cultivating both on the ridges and hollows of the field.

To the above purpose my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of my improved machine. Fig. 2 is a top plan view of the same. Fig. 3 is an under side plan view of the same. Figs. 4 and 5 are detached views of the planting and chopping wheels. Fig. 6 is a similar view of the covering-plow.

In the said drawings, A A designate two horizontal parallel timbers, which are connected at their front ends by a cross-piece, $a$, and at their rear ends by a cross-piece, $a'$, as shown.

B designates the tongue, to which a team is to be suitably hitched, and the rear end of which is suitably attached and braced to the cross-piece. The carrying-frame, as thus constructed, is mounted upon a pair of carrying-wheels, C, which turn upon stub-axles $c$, bolted underneath the frame-timbers A.

D D designate two upright guide-frames, which are secured opposite to each other upon the inner sides of frame-pieces A, and about midway of the length of said pieces. On its inner side each of these guide-frames is provided with two parallel guide-strips, $d$, and the tops of said guide-pieces are braced together by a cross-piece, $d'$, which is secured to two vertical pieces, $d^2$, suitably attached to the guide-strips, as shown.

E designates an idler-frame, which plays vertically between the guide-frames D, and within their guide-strips $d$. This idler-frame is composed of two parallel pieces, $e$, corresponding in width with the spaces between each pair of guide-strips $d$, and united at top by a cross-piece, $e'$. This frame E carries the planting and chopping wheels, to be hereinafter described, and is connected at top by a chain, $e^2$, with a lever, $e^3$, which is pivoted upon the cross-piece $d'$ of the guide-frames D.

The planting-wheel G is a narrow hollow drum, from opposite sides of the center of which extend stub-axles $g$, which enter and turn in suitable sockets, $d^3$, in the vertically-movable idler-frame E, by which it is carried, the rim of said wheel being perforated with holes $g'$ for the escape of seed.

The chop-wheel H is a solid wheel, the periphery of which is cut away to form a series of notches, $h$, for a purpose to be hereinafter explained, and which is also provided with a rigid axle, $h'$, the ends of which turn in the sockets $d^3$ of idler-frame E when said chopper-wheel is in use.

I designates a plowshare, which is secured detachably to the under part of cross-piece $a$, for the purpose of opening a furrow to receive the seed when the seeding-wheel G is employed, said plow being removed when the seeding-wheel is not in use. A cross-bar, $i$, is attached to the under side of the frame-pieces A A at their front ends, and to this cross-bar is attached the plow I.

To the rear ends of the frame-pieces A A, at their under sides, is secured a cross-bar, $j$, having links $j'$, to which the clevises $j^2$ of a double covering plow or cultivator, J, are detachably secured. The standards $j^5$ of these two plow-sections are connected loosely together by bars $j^3$, as shown, so that said plow-sections may be moved freely relative to each other by manipulations of the handles $j^4$. When the chopping-wheel H is used, the covering-plows J are employed, while when the seeding-wheel G is in use the double plow is detached from the machine.

By virtue of the above-described construction a machine is produced which is capable of use both as a seeder, chopper, and cultivator, and one which will work both on the ridges and in the furrows. The notches in the chop-wheel receive such of the young plants as are to be left standing, while the solid spaces between the notches press the other plants into the soil. The double plow then cultivates the standing plants and buries those that have been pressed into the soil. The sliding frame yields to all inequalities in the soil, and is raised by the lever $c^3$ when the machine turns.

The seed-drum and chopping-wheel are loosely journaled in and supported by the vertically-movable idler-frame, and the peripheries of the said drum and wheel are in contact with the surface of the ground, so that they are rotated by frictional contact when the machine is drawn across the field. The seed-drum and chopper-wheel are interchangeable with each other, to adapt the same machine to two distinct classes of work—that of planting the seed and then chopping the growing plants.

The seed-drum and chopper-wheel accommodate themselves to the uneven or irregular surfaces in the ground, as the idler-frame plays freely in the guide-frame, and the said idler-frame and the device journaled therein (either the seed-drum or chopper-wheel), can be elevated by means of the hand-lever $c^3$, so that the drum or chop-wheel is elevated out of contact with the ground, and thus thrown out of use, as is sometimes necessary—for instance, when moving from the barn to the field, or vice versa, or from one field to another.

Having thus described my invention, what I claim as new, and desire to secure by Letters Patent, is—

1. The combination of a main frame, the wheels, the vertical guide-frame affixed to the carrying-frame, and the vertically-sliding idler-frame arranged to slide freely within the guide-frame, adapted to carry either the seed or chopping devices, and thereby permit the latter to accommodate themselves to unevenness in the soil, substantially as described, for the purpose set forth.

2. The combination of a main frame, the bearing-wheels, a vertical guide-frame affixed to the carrying-frame, an idler-frame arranged to slide freely within the guide-frame, and adapted to carry either the seed or chopping devices, to permit the latter to accommodate themselves to unevenness of the soil without hinderance, and a hand-lever pivoted to the carrying-frame and connected to the idler-frame for elevating the latter and the device carried thereby out of contact with the ground, substantially as described, for the purpose set forth.

3. The combination of a main frame, the carrying-wheels journaled thereon, a vertical guide-frame affixed to the main frame, an idler-frame fitted within the guide-frame and capable of free vertical movement therein, a hand-lever connected to the idler-frame for elevating the same, a chop-wheel journaled in the idler-frame and having the notched periphery, and the loosely-connected plow-standards depending from the main frame at the rear thereof and carrying the shovels, substantially as described, for the purpose set forth.

In testimony that I claim the foregoing as my own I have hereto affixed my signature in presence of two witnesses.

LEE PASCHAL PITTS.

Witnesses:
M. J. HATHAWAY,
D. K. FOOSHEE, Jr.